(12) United States Patent
Keith

(10) Patent No.: US 11,140,876 B2
(45) Date of Patent: Oct. 12, 2021

(54) BIRD FEEDER WITH BEAK DETECTION

(71) Applicant: Kaden Blair Keith, Windsor, CA (US)

(72) Inventor: Kaden Blair Keith, Windsor, CA (US)

(\*) Notice: Subject to any disclaimer, the term of this patent is extended or adjusted under 35 U.S.C. 154(b) by 465 days.

(21) Appl. No.: 16/365,159

(22) Filed: Mar. 26, 2019

(65) Prior Publication Data

US 2020/0305396 A1 Oct. 1, 2020

(51) Int. Cl.
*A01K 39/02* (2006.01)
*G01P 1/12* (2006.01)
*G01P 13/00* (2006.01)

(52) U.S. Cl.
CPC .......... *A01K 39/0206* (2013.01); *G01P 1/12* (2013.01); *G01P 13/00* (2013.01)

(58) Field of Classification Search
CPC ........ A01K 39/0206; G01P 1/12; G01P 13/00
See application file for complete search history.

(56) References Cited

U.S. PATENT DOCUMENTS

| | | | | |
|---|---|---|---|---|
| 6,792,891 | B1* | 9/2004 | Coburn | A01K 39/02 119/57.8 |
| 7,748,347 | B2* | 7/2010 | Richmond | A01K 39/0206 119/72 |
| 9,247,719 | B1* | 2/2016 | Bennett | A01K 39/0206 |
| 2021/0068937 | A1* | 3/2021 | Blum | A61D 15/00 |

\* cited by examiner

*Primary Examiner* — Elias Desta
(74) *Attorney, Agent, or Firm* — Law Office of Scott C Harris, Inc

(57) ABSTRACT

A hummingbird and oriole feeder having a nectar reservoir that allows the beak of a feeding bird to access a nectar access point to the nectar. An optical sensor senses the bird's beak entering the nectar access point. The optical sensor can include an optical transmitter forming a beam of light that is received by an optical receiver. The intrusion of a bird's beak into the nectar access point, which occurs when the bird is feeding on the nectar, interrupts the beam of light, creating a change in an electrical signal. The electrical signal is sent to a processing unit that counts each time a bird's beak penetrates the nectar access point and displays the count on the display unit. The count can be reset to zero by a reset switch. There can be multiple nectar access points, which are each counted, using a multiplexer.

11 Claims, 2 Drawing Sheets

BIRD FEEDER WITH BEAK DETECTION

BACKGROUND

Birdfeeders can provide food for birds, but often are also used to encourage birds to locations nearer the feeder, and also to allow people to view different birds who arrive at the feeder.

Birdfeeders can feed solid food such as seeds, and can also provide liquid food such as simulated nectar.

A nectar based birdfeeder is often used for feeding hummingbirds and orioles and other birds that prefer to drink nectar. A birdfeeder of this type typically includes a reservoir, extending to a bird feeding location, referred to herein as a spout, open to the outside. The birds can drink the liquid through the spout.

SUMMARY OF THE INVENTION

The present application describes a special birdfeeder which includes a sensor that senses the birds feeding from the feeder, and provides a count of how many times birds have put their beaks into the feeder.

Other embodiments are described herein.

DETAILED DESCRIPTION

Figure 1:
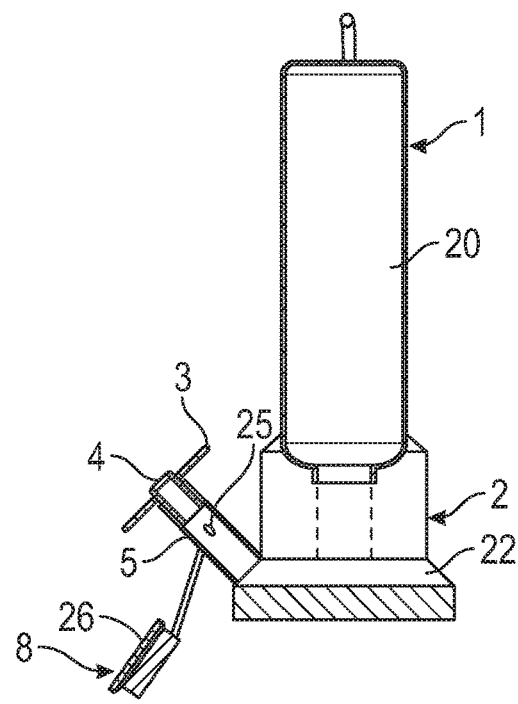
FIG. 1 shows a side view of the bird feeder.
Figure 2:
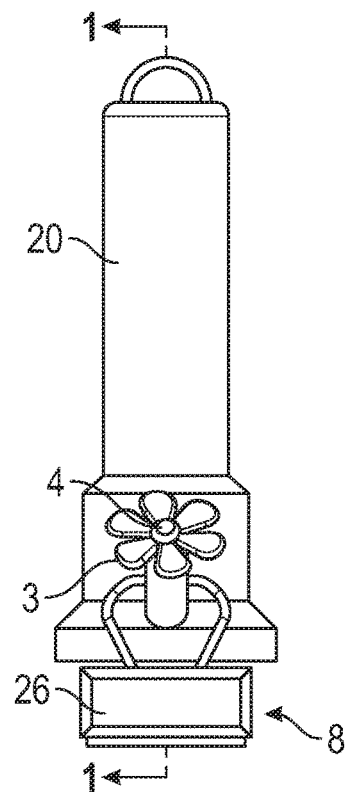
FIG. 2 shows a front on view of the birdfeeder.

Embodiments describe a birdfeeder for liquid nectar feeding, e.g. a hummingbird and oriole feeder. The birdfeeder, as shown in FIGS. 1 and 2, includes a reservoir 1 within which is located nectar shown generally as number 20. The reservoir 1 is connected to a drinking tube 5, leading to a spout 4, also referred to herein as a nectar access point. The spout has an opening through which the birds can drink.

In an embodiment the spout 4 is located on a bird attracting target 3, which here is shown as a flower but can have other presentations. The nectar reservoir 1 extends down into the base 2, and fills the bottom of the base 22 with liquid which through liquid equalization is available for drinking at the spout 4 of the drinking tube.

An optical sensor 25 is located inside the drinking tube 5 in a place where the birds beak will be sensed by the optical sensor. In an embodiment, the optical sensor, has an optical transmitter and an optical receiver aligned such that a transmitted beam of light from the optical transmitter is received by the optical receiver when nothing is between the optical transmitter and optical receiver. The optical transmitter and an optical receiver are aligned such that the transmitted beam of light is interrupted by the insertion of a birds beak into the nectar access point between the optical transmitter and optical receiver. A processing unit 320 is connected to the optical receiver, by two or more wires 21, where the processing unit counts a number of times that the transmitted beam of light is interrupted by the insertion of a birds beak into the nectar access point.

This structure can be located inside a monitoring box 8, which is connected by wires 21 to the optical sensors 310.

The monitoring box 8 can also include a display 26 which displays information as described herein.

In operation, the beak of the feeding bird enters one or more nectar access points shown as 4. The optical sensors which in one embodiment can be formed of an optical transmitter 300 and an optical receiver 310 forming a beam of light between the transmitter and receiver that is between the nectar access point 4, and the nectar level 308. The birds beak going into the access point between the transmitter and receiver interrupts the beam of light, thus creating an electrical signal to the processor 320.

Figure 3:
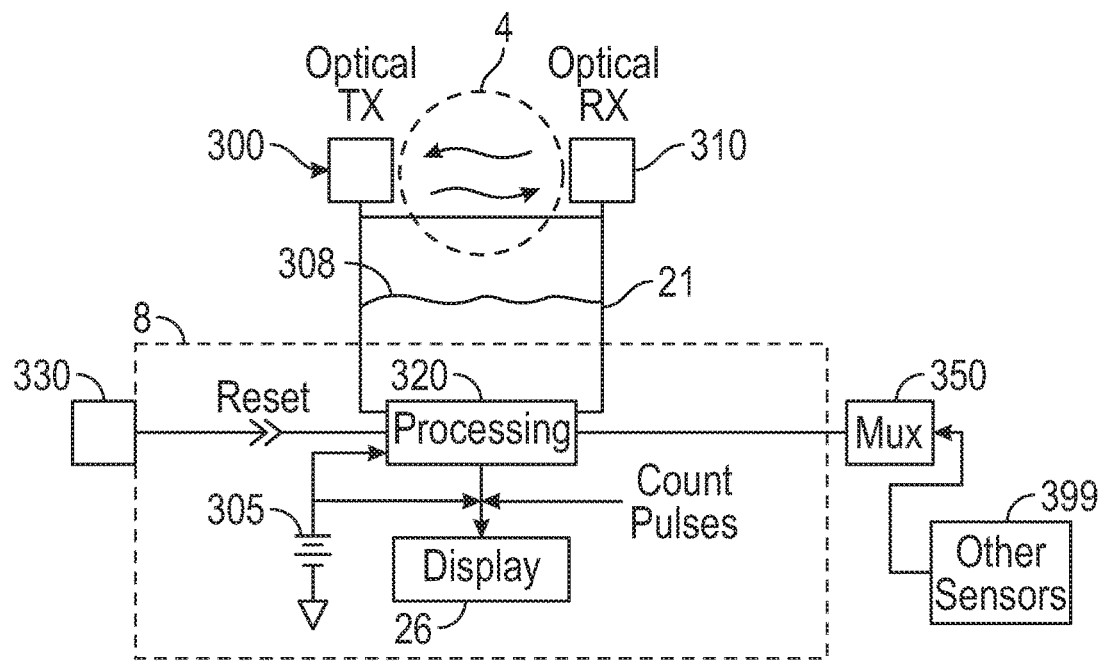
FIG. 3 shows an electrical block diagram of the processing operation.

In an embodiment, the circuitry is as shown in FIG. 3. An optical transmitter 300 is powered by a power supply 305 inside the monitoring circuit 8. The power supply 305 can be for example a button battery. The optical transmitter 300 transmits a beam of light to an optical receiver 310. Each time the optical receiver signal is interrupted in some way, this is sensed by the processor 320 which counts this is a pulse, and drives the display 26 to increase the displayed number of pulses.

In an embodiment, there is also a reset switch shown as 330, which resets the number of pulses to zero, allowing the processing to start over again.

The first embodiment senses the birds beak's entry on a single bird access point. However, in other embodiments, there can be a multiplexer 350 which multiplexes bird's beak entries at multiple different nectar access points 300, 310, as well as other sensors 399, together. In another embodiment, there can be a separate processor which is programmed to count the optical pulses.

In operation, the processing unit 320 counts each time the birds beak penetrates the nectar access point 4, and displays the count on the display unit 26. In this way, the user can tell how many times birds have drank from the nectar access point since the last reset. The reset button 330 signals the processor to reset the count to 0.

Figure 4:
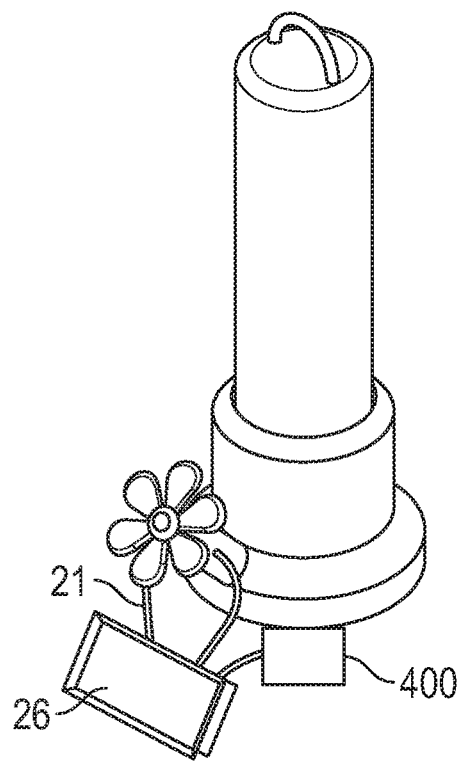
FIG. 4 shows the view showing a display.

In one embodiment, the monitoring box 8 holds the display and also houses the circuitry described herein. In another embodiment, there can be a box shown as 400 in FIG. 4 attached to the hummingbird feeder that holds the battery and circuitry, and provides power to all the subsystems.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A bird feeder comprising;

a nectar storage part;

a feeding area cover with at least one opening that serves as a nectar access points for a bird's beak;

an optical sensor, having an optical transmitter and an optical receiver aligned such that a transmitted beam of light from the optical transmitter is received by the optical receiver when no bird's beak is between the optical transmitter and optical receiver, where the optical transmitter and the optical receiver are aligned such that the transmitted beam of light is interrupted by the insertion of a birds beak into the nectar access point;

a processing unit connected to the optical receiver, where the processing unit counts a number of times that the transmitted beam of light is interrupted by the insertion of a birds beak into the nectar access point, a display unit that displays a number indicating the number of times that the transmitted beam of light is interrupted by the insertion of a birds beak into the nectar access point, and a power supply for powering the system enabling the system to display the number of time a bird's beak has been inserted into the nectar access point.

2. The bird feeder as in claim 1, wherien the bird feeder is configured as a hummingbird or oriole feeder.

3. The bird feeder as in claim 1, wherein the nectar storage part includes a first part which holds nectar, and a second part in which extends at an angle from the first part, and the nectar access point is attached to the second part.

4. The bird feeder as in claim 3, wherein the nectar access point is in the shape of the flower with a hole in the middle.

5. The bird feeder as in claim 1, wherein there are multiple different nectar access points attached to the same nectar storage part.

6. The bird feeder as in claim 5, wherein there is an optical transmitter and optical receiver on each of the multiple different nectar access points, and where the processing unit counts each time any birds beak interrupts any light between any optical transmitter and optical receiver.

7. The bird feeder as in claim 6, wherein further comprising a multiplexer which multiplexes the signals from the multiple different optical receivers, to allow the processing unit to count each of the signals.

8. The bird feeder as in claim 1, further comprising a reset switch which resets the count indicating the number of times that the transmitted beam of light is interrupted by the insertion of a birds beak into the nectar access point, and allows the count of the number of times to restart at zero.

9. The bird feeder as in claim 1, wherein the display is in a housing that is separate from the bird feeder, and attached thereto by at least first and second wires.

10. The bird feeder as in claim 9, wherein the housing also houses the power supply and the processing unit and the reset button.

11. The bird feeder as in claim 9, further comprising a separate housing which houses the battery.

\* \* \* \* \*